United States Patent [19]
Li

[11] Patent Number: 5,881,936
[45] Date of Patent: Mar. 16, 1999

[54] MOTORCYCLE CADDY

[76] Inventor: Bernard A. Li, P.O. Box 8705, Rancho Santa Fe, Calif. 92067

[21] Appl. No.: 46,955

[22] Filed: Mar. 24, 1998

[51] Int. Cl.[6] .................. B62J 11/00; B62J 7/06
[52] U.S. Cl. .................. 224/413; 224/419; 224/430; 224/926; 248/311.2; 280/288.4
[58] Field of Search ................. 224/400, 401, 224/412, 419, 420, 428, 429, 430, 276, 482, 483, 926, 930; 280/288.4; 248/311.2; 180/218, 219; 108/44, 45

[56] References Cited

U.S. PATENT DOCUMENTS

| | | |
|---|---|---|
| D. 242,853 | 12/1976 | Dixson . |
| D. 242,997 | 1/1977 | Dixson . |
| D. 278,328 | 4/1985 | Hoese . |
| D. 300,417 | 3/1989 | Knecht . |
| 2,321,192 | 6/1943 | Fischer . |
| 3,804,233 | 4/1974 | Gregg, Jr. ................ 224/926 X |
| 4,066,290 | 1/1978 | Weigert et al. ........... 280/288.4 X |
| 4,176,770 | 12/1979 | Griggs et al. . |
| 4,312,465 | 1/1982 | Sinkhorn et al. . |
| 4,436,350 | 3/1984 | Jolin . |
| 4,445,228 | 4/1984 | Bruni . |
| 4,613,048 | 9/1986 | McGill ........................ 108/44 X |
| 4,754,901 | 7/1988 | Villanueva et al. ......... 224/420 X |
| 4,800,664 | 1/1989 | Marstall . |
| 5,001,779 | 3/1991 | Eggert . |
| 5,005,661 | 4/1991 | Taylor et al. . |
| 5,102,021 | 4/1992 | Perea . |
| 5,114,060 | 5/1992 | Boyer . |
| 5,222,752 | 6/1993 | Hewitt ........................ 224/420 X |
| 5,251,795 | 10/1993 | Jeppesen . |
| 5,423,509 | 6/1995 | LaPorte et al. ............. 224/420 X |
| 5,487,497 | 1/1996 | Kwiatkowski ............... 224/420 |
| 5,509,633 | 4/1996 | Ruster et al. ................ 224/926 X |
| 5,664,718 | 9/1997 | Vince . |

Primary Examiner—Gregory M. Vidovich
Attorney, Agent, or Firm—Fulwider Patton Lee & Utecht, LLP

[57] ABSTRACT

A caddy, constructed of soft compressible foam to be held between the handlebars and windshield of a motorcycle for receiving and holding objects therein for easy access by the rider during operation of the motorcycle.

14 Claims, 2 Drawing Sheets

MOTORCYCLE CADDY

BACKGROUND OF THE INVENTION

1. Field of the Invention

The present invention relates to a device to be held between the handlebars and windshield of a motorcycle for holding objects therein.

2. Description of the Prior Art

Motorcycle enthusiasts have long sought ways of storing objects on their motorcycles while they ride. Many means which have been employed, such as saddlebags, have required that the rider dismount the motorcycle to gain access to the items stored therein. There are, however, many objects such maps and touring booklets, that a rider would want to have convenient access to while riding. In addition, many motorcycles are now equipped with stereos making convenient and accessible storage of compact disks desirable. Similarly, it would be desirable during a long ride in hot weather, to have convenient access to a beverage container.

One type of device which has been developed to provide such storage capability consists of a holder which is mounted to the handlebars of a motorcycle. Examples of such a device are disclosed in U.S. Pat. Nos. 5,102,021, 5,005,661, 5,114,060 and 4,436,350. These devices provide solid and secure mounting for specific items such as a radar used by a police officer. However, because these devices fasten to handlebars using clamps, installation and removal can be difficult and is time consuming requiring the use of extraneous tools, making such devices unsuitable for temporary, intermittent use. In addition, the use of clamps can result in scratching the motorcycle or handle bars.

Similar devices have been used to provide a pad for holding maps, booklets or other such items. Devices of this type are disclosed in U.S. Pat. Nos. 2,321,192, and 4,800,664. Such devices provide a holder in the form of a clipboard and are effective for holding maps or booklets to be read while riding. However, these device are specifically designed for holding particular objects and are not adaptable for use in holding other objects such as water bottles and compact disks. In addition these devices suffer the aforementioned shortcomings that they are difficult to install and remove and pose a risk of scratching the motorcycle.

Yet other devices have been employed to provide accessible water or other beverages. One such device is disclosed in U.S. Pat. No. 4,176,770 and provides a canteen configured with a groove to fit over a cross bar of the handlebars of a motorcycle. This device is provided with a strap for attaching to the cross bar. While this device provides somewhat easy access to the beverage, it does not provide for storage of other items and can only be used on a motorcycle having a cross bar.

Other drink holders have been developed which consist of cylindrical holders which can be mounted to the structure of a motorcycle by either a clamp, as disclosed in U.S. Pat. No. 4,312,465, or by bolt or other similar fastener as disclosed in U.S. Pat. No. 5,664,718. Such devices are effective for holding beverages, however they are not capable of holding other items and suffer the previously mention drawback that they require clamps or other hardware making installation and removal difficult.

Still another device, shown in U.S. Pat. No. 4,445,228, has been employed to provide a holder for a stereo system. This device supports the stereo from mirror mounting brackets attached to the handlebars of the motorcycle. While this device provides secure installation of a stereo, it too is not easily installed or removed and does not provide storage for various other articles.

In addition, U.S. Pat. No. Des. 278,328 and U.S. Pat. No. Des. 242,997 disclose consoles for housing a radio or gauges on a motorcycle. These consoles have rearward facing openings for receiving a permanently mounted radio or instruments. The consoles themselves are likewise designed to be permanently attached the motorcycle. The devices disclosed in these patents are not easy to install and remove and are not designed to hold a variety of objects to be easily accessed during motorcycle use.

Further, U.S. Pat. No. Des. 300,417 discloses a device which is intended to hold a cigar lighter. As with the previously mentioned devices this device is intended to be attached to the handlebars of a motorcycle by means of a clamp, making installation and removal difficult and posing a risk of damaging the motorcycle.

Therefore, there remains a need for a device for storing items on a motorcycle, which can be easily and quickly installed and removed, which provides easy access to the objects held therein, and which can be adapted to hold a wide variety of small objects. There also remains a need for a device that will not risk damaging the motorcycle to which it is attached and which is inexpensive to manufacture.

SUMMARY OF THE INVENTION

Briefly and in general terms, the present invention is directed to a device to be held between the handlebars and windshield of a motorcycle, for holding objects therein. The device can be installed and removed in seconds, and when installed, allows easy access to the objects stored therein while the motorcycle is being ridden. The device, may be constructed of soft compressible foam so that it will not scratch or otherwise damage the motorcycle on which it is installed.

The device of the present invention employs a caddy block, which, being constructed of compressible synthetic foam, can be configured to have a length from front to back greater than the distance between the handle bars and mount for the windshield of the motorcycle. In this way the caddy block can be compressed and placed between the handle bars and windshield where it will expand to be firmly held therebetween.

The caddy block comprises a pair of flanking tables having flat tops. The tables are joined by a yoke, disposed at the front of the caddy block to provide clearance for an instrument, such as a speedometer, which may be mounted above the handle bars of the motorcycle. Extending backward from the lower part of the yoke a flange may be provided, which can fit below the instrument when the device is properly installed on the motorcycle. The tables, yoke and flange cooperate to form a cavity into which the instrument will fit, thereby helping to hold the caddy block in place. The flange is provided with a notch which will receive a portion of a gooseneck of the motorcycle and thereby further help to hold the caddy block in place.

The caddy block can be provided at its top with a plurality of openings for receiving and holding objects. The openings may be variously configured depending upon the shape of the objects to be held. For example openings may be provided which are rectangular and of proper size and shape to receive and store compact disks or cassettes. An opening may also be provided which is cylindrical to receive a beverage container and others configured to receive maps or booklets.

A chamfered bezel may also be incorporated between the top and back surfaces of the caddy block having corresponding angled openings. This feature would provide a surface and accompanying openings which are angled toward the user to facilitate quick and easy access to the objects held therein.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENT

Figure 1:
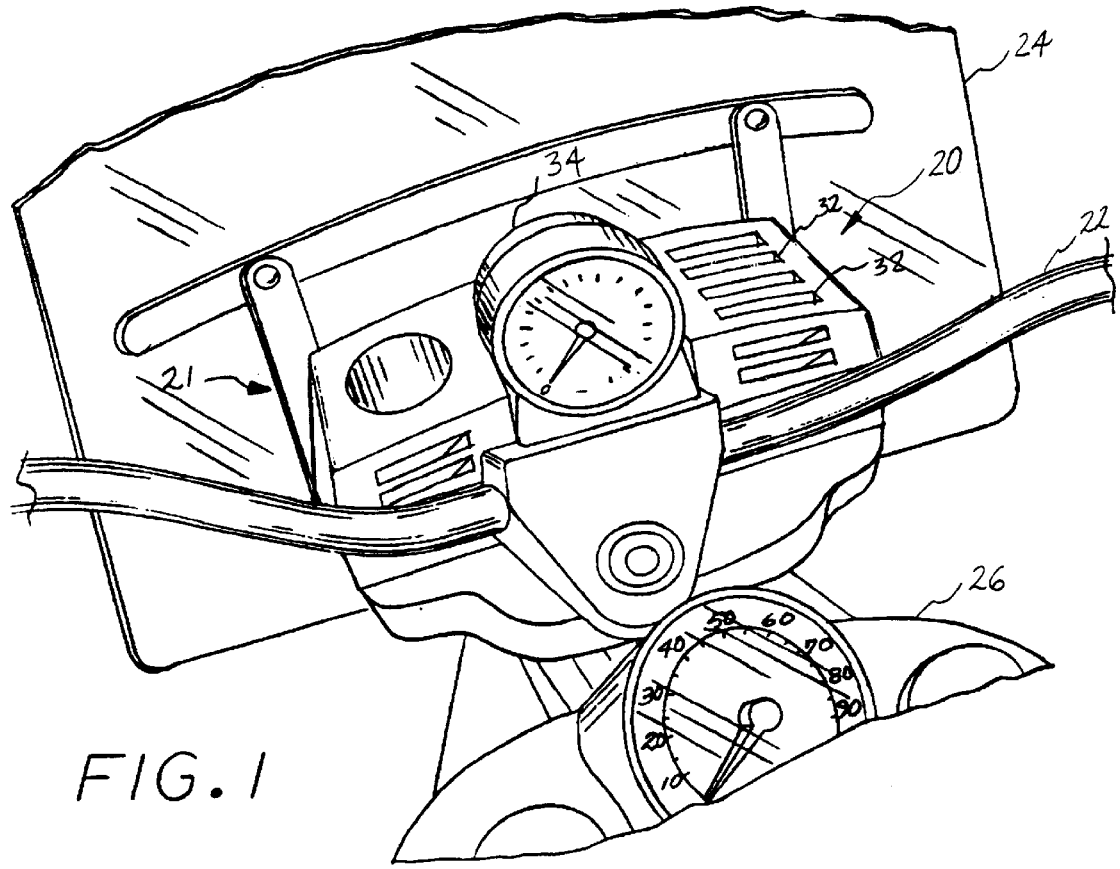
FIG. 1 is a perspective view of the caddy device embodying the present invention shown installed on a motorcycle.
Figure 3:
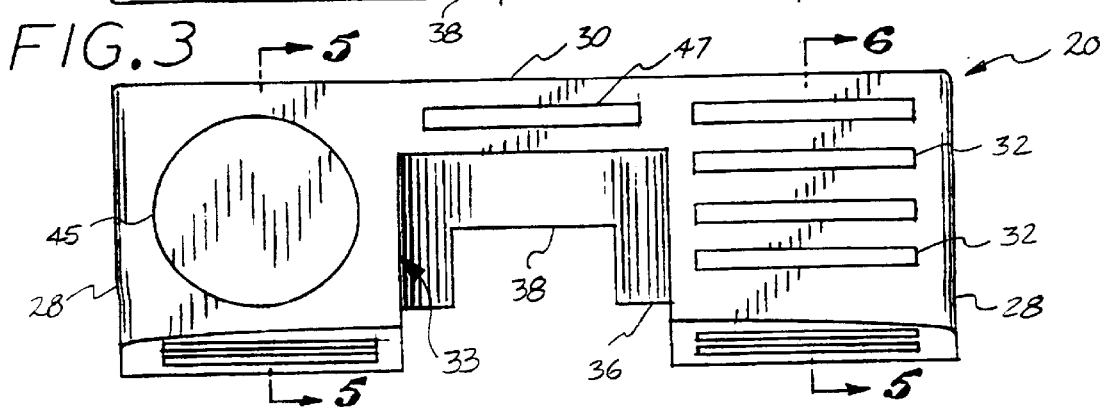
FIG. 3 is a top view of the caddy device shown in FIG. 1, in enlarged scale.
Figure 4:
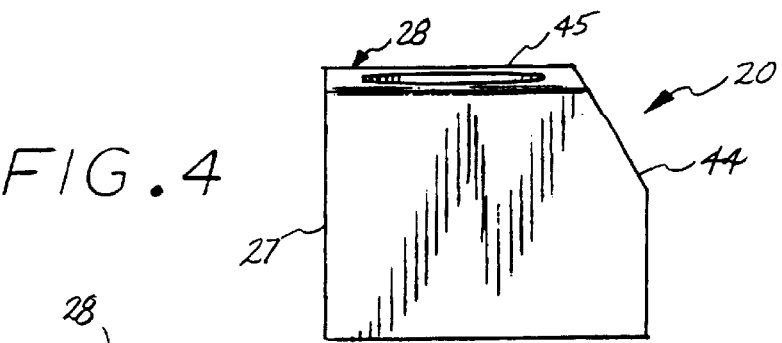
FIG. 4 is a left end view of the caddy device shown in FIG. 1, in enlarged scale.
Figure 5:
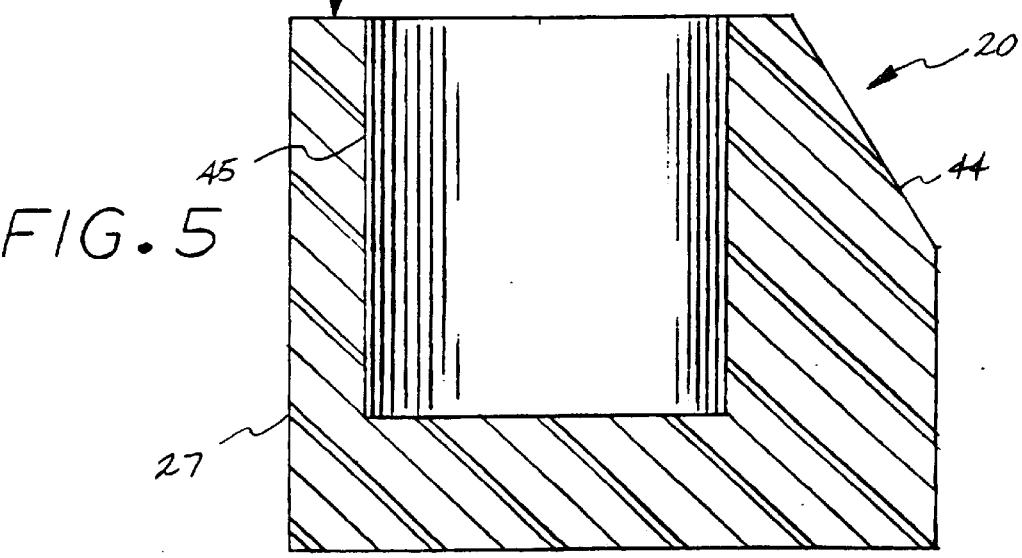
FIG. 5 is a sectional view, in enlarged scale, taken along line 5—5 of FIG. 3.

In the following detailed description, like reference numerals will be used to refer to like or corresponding elements in the different figures of the drawings. Referring to FIG. 1, the caddy block of the present invention is embodied in an apparatus, generally referred to as 20 which can be held between the handle bars 22 and windshield 24 of a motorcycle 26 for storing objects therein. Referring to FIG. 3, the device can be easily and quickly installed and removed without damage to or modification of the motorcycle. The caddy block 20 includes, generally, a pair of flanking tables 28 joined centrally by a yoke 30. Various upwardly openings slots 32 are formed in the right hand side of the caddy block and at least one cylindrical cavity 45 is formed on the left hand side and opens upwardly for receipt of, for instance, a beverage container (not shown).

Referring to FIG. 1, the caddy block 20 is constructed of a compressible material and is configured so that the distance from the front to the back of the caddy block is slightly greater than the distance from the handlebars 22 to the frame 21 mounting the windshield 24. In this way the caddy block can be wedged into the space between the handle bars and the windshield. The front wall 27 is slightly convex in top plan view to curve outwardly and rearwardly to generally complement the lateral curvature of a conventional motorcycle windshield. As such caddy is wedged into position, the surface thereof can be compressed slightly in various areas to indent and closely conform to the various struts and motorcycle components to nest firmly in position.

Figure 2:
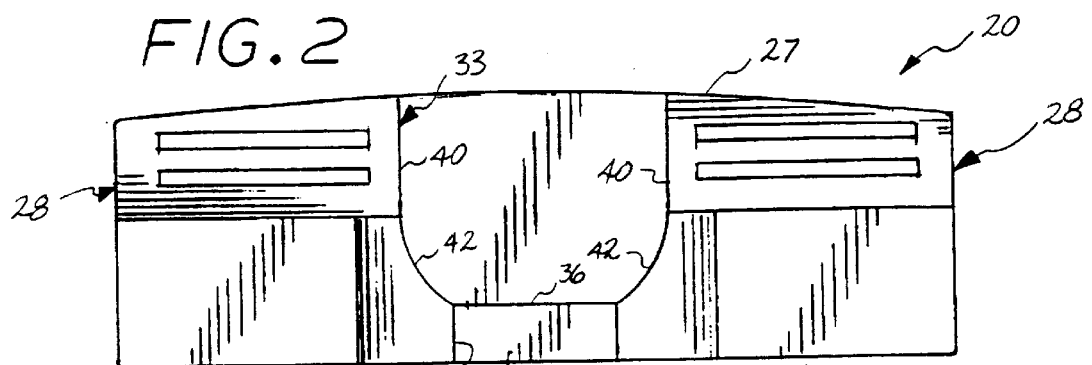
FIG. 2 is a back view of the caddy device shown in FIG. 1, depicted in enlarged scale.
Figure 6:
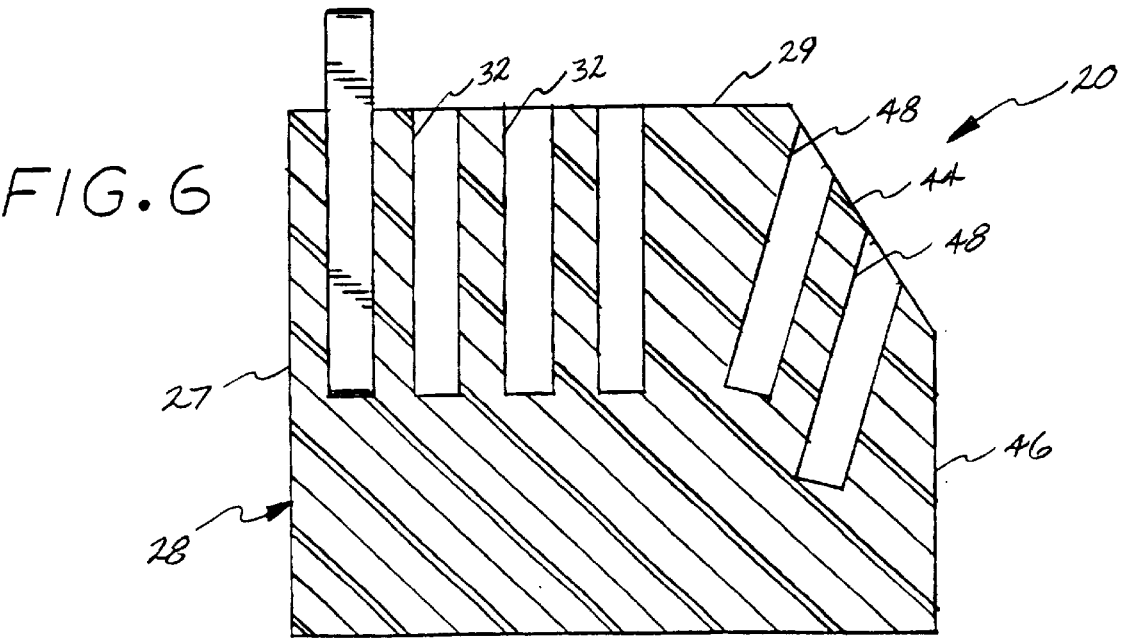
FIG. 6 is a sectional view, in enlarged scale, taken along line 6—6 of FIG. 3.

With reference to FIGS. 2 and 3, the tables 28 are formed with flat top surfaces 29 (FIG. 6). Because many motorcycles are provided with instruments 34 (FIG. 1) such as speedometers mounted centrally on the handle bars 22 of the motorcycle, the tables 28 (FIGS. 2 and 3) are arranged such that when the caddy block is mounted on the motorcycle 26 the tables will be disposed on either side of the instrument within easy reach of the rider while the motorcycle is being ridden.

With continued reference to FIGS. 2 and 3, the tables are joined by a yoke 30, which is disposed at the front of the caddy block so as to, when installed, provide clearance for the instrument 34 and tables 28 and cooperate in forming a somewhat cup shaped rearwardly opening instrument receiving cavity, generally designated 33. Projecting rearwardly from the bottom of the yoke 30 is a flange 36 configured to nest underneath the instrument 34. Since motorcycles are equipped with goose necks which comprise the mounting structure to which the handlebars 22 attach, the flange is provided with a rearwardly opening clearance notch 38 to receive and wrap around the gooseneck to provide clearance for the gooseneck as well as assist in holding the caddy block 20 in place on the motorcycle. The notch is rectangular in top plan view and is centrally disposed in the flange 36.

With reference to FIG. 2, the confronting walls 40 of the tables 28 meet the flange 36 to form downwardly and inwardly curved surfaces 42 cooperating to form a sector of a cylinder. The walls 40, flange 36 and curved surfaces 42 form an upwardly and rearwardly opening cavity into which the instrument 34 can fit.

With continued reference to FIGS. 2 and 3, the slots are rectangular shaped for telescopical receipt of, for instance, compact disks, cassette tapes or the like. Referring to FIG. 3, formed centrally in the yoke 30 is an upwardly opening slot 47 configured for receipt of maps or booklets. It will be appreciated by those skilled in the art that, while specific configurations of openings have been disclosed, myriad other configurations of openings are possible depending upon what articles are desired to be held in the caddy block 20.

With reference to FIG. 6, in the preferred embodiment, the caddy block is formed along the back edge of the top with a chamfer 44 to angle downwardly and rearwardly toward the rider. This makes access more convenient resulting in a more ergonomic design. To further increase the ergonomic efficiency of the design, upwardly and rearwardly opening slots 48 are formed in spaced relation to open upwardly and rearwardly in the respective bezels. In this way, when a rider removes or inserts an object into these openings 48, the rider will be pulling directly toward himself in an easy fluid motion, minimizing the time during which the rider's attention is distracted and during which his or her hand will be removed from the handlebars 22 (FIG. 1), improving convenience as well as promoting safety.

It will be appreciated by those skilled in the art, that the caddy block 20 of the present invention can be easily and inexpensively constructed of a pliable resilient synthetic foam such as Styrofoam urethane. Such construction can be easily and inexpensively performed by injection molding, resulting in a very cost effective product. The foam will provide the resilience and compressibility necessary to allow the caddy block 20 to be held firmly in place in a variety of motorcycle configurations and will not scratch or otherwise damage the motorcycle on which it is installed. The foam will tend to expand against the items held within the openings to securely hold the items therein, and in addition, will act as a vibration damper, thereby preventing the items from rattling during operation of the motorcycle.

With reference to FIG. 1, in use, the caddy block 20 is placed between the handlebars 22 and windshield 24 of the motorcycle 26 and manually pressed downwardly. Since the caddy block 20 is designed to be slightly larger than the space between the handlebars 22 and windshield frame 21, it will be compressed somewhat to conform to the shape of the testing space provided to be held firmly in place. Once in place, objects such as compact discs, booklets or a beverage container can be placed into the appropriate cavities in the top of the caddy block 20, and the motorcycle 26 can then be operated with the various objects held securely within the caddy block. When the caddy block 20 is not needed, it can be easily removed by simply pulling it upward.

From the forgoing it will be appreciated that the motorcycle caddy block of the present invention provides a very inexpensive and convenient means for holding objects on a motorcycle so as to be easily accessible to the rider while operating the motorcycle. It will also be appreciated that the caddy block embodying the present invention can be easily and quickly installed and removed, without using any tools and without damaging or modifying the motorcycle.

While a particular form of the invention has been illustrated and described, it will be apparent that various modifications can be made without departing from the spirit and scope of the invention.

What is claimed is:

1. A motorcycle caddy for mounting in the spacing formed between the handle bars and forwardly disposed windshield of a motorcycle, the motorcycle including an instrument mounted forwardly of the handle bars, said caddy comprising:

a lightweight integral caddy block configured to be interposed in nesting relationship in said spacing and formed with laterally disposed flanking tables to be disposed on opposite sides of said instrument and having respective upwardly facing table top surfaces;

one said table being configured with upwardly opening rectangular shaped object-receiving openings and the other said table being formed with an upwardly opening cylindrical cavity; and said caddy block further including a forwardly disposed yoke connecting said tables together and cooperating with the respective said tables to form an upwardly and rearwardly opening instrument cavity for, when said block is nested in said spacing, receiving a portion of said instrument therein.

2. A motorcycle caddy as set forth in claim 1 wherein: said block is of closed foam construction.

3. A motorcycle caddy as set forth in claim 1 wherein: said block is compressible to flex under force to be flexed and fitted in said spacing.

4. A motorcycle caddy as set forth in claim 1 wherein: at least one of said tables is formed at its upper rear with a downwardly and rearwardly shaped chamfer; and said one of said tables is formed with an upwardly opening object-receiving cavity opening extending into said chamfer.

5. A motorcycle caddy block as set forth in claim 1 wherein:

said yoke is formed with an upwardly opening object-receiving cavity.

6. A motorcycle caddy as set forth in claim 1 wherein:

the bottom of said yoke is formed with a flange projecting rearwardly of said yoke to be fitted under said instrument.

7. A motorcycle caddy as set forth in claim 1 wherein:

said tables are formed on their confronting sides with downwardly and inwardly curved surfaces cooperating to form a sector of a cylinder.

8. A motorcycle caddy for mounting in the spacing formed between the handle bars and a forwardly disposed windshield mount of a motorcycle defining a predetermined distance therebetween, the motorcycle including an instrument mounted forwardly of said handle bars, said caddy comprising:

a lightweight integral caddy block configured to be interposed in nesting relationship in said spacing and formed with laterally disposed flanking tables to be disposed on opposite sides of said instrument and having respective upwardly facing table surfaces;

one said table being configured with an upwardly opening rectangular shaped object-receiving cavity and the other said table being formed with an upwardly opening cylindrical cavity;

said caddy block further including a forwardly disposed yoke connecting said tables together and cooperating with the respective said tables to form an upwardly and rearwardly opening instrument cavity for, when said block is nested in said spacing, receiving a portion of said instrument therein;

said caddy block being compressible and having a dimension from front to back greater than said predetermined distance between said handlebars and said windshield mount.

9. A motorcycle caddy as set forth in claim 8 wherein: said block is constructed of foam.

10. A motorcycle caddy as set forth in claim 8 wherein: said block flexing under force to be flexed and fitted in said spacing.

11. A motorcycle caddy as set forth in claim 8 wherein:

at least one of said tables is formed at its upper rear with a downwardly and rearwardly shaped chamfer; and said one of said tables is formed with an upwardly opening object-receiving receptacle opening extending into said chamfer.

12. A motorcycle caddy as set forth in claim 8 wherein: said yoke is formed with an upwardly opening object-receiving receptacle.

13. A motorcycle caddy as set forth in claim 8 wherein:

the bottom of said yoke is formed with a flange projecting rearwardly of said yoke to be fitted under said instrument.

14. A motorcycle caddy as set forth in claim 8 wherein:

said tables are formed on their confronting sides with downwardly and inwardly curved surfaces cooperating to form a sector of a cylinder.

* * * * *